Jan. 31, 1950 C. F. DROWN ET AL 2,495,709
WEIGHT AND BALANCE TRAINING MODEL
Filed Aug. 20, 1946 2 Sheets-Sheet 1
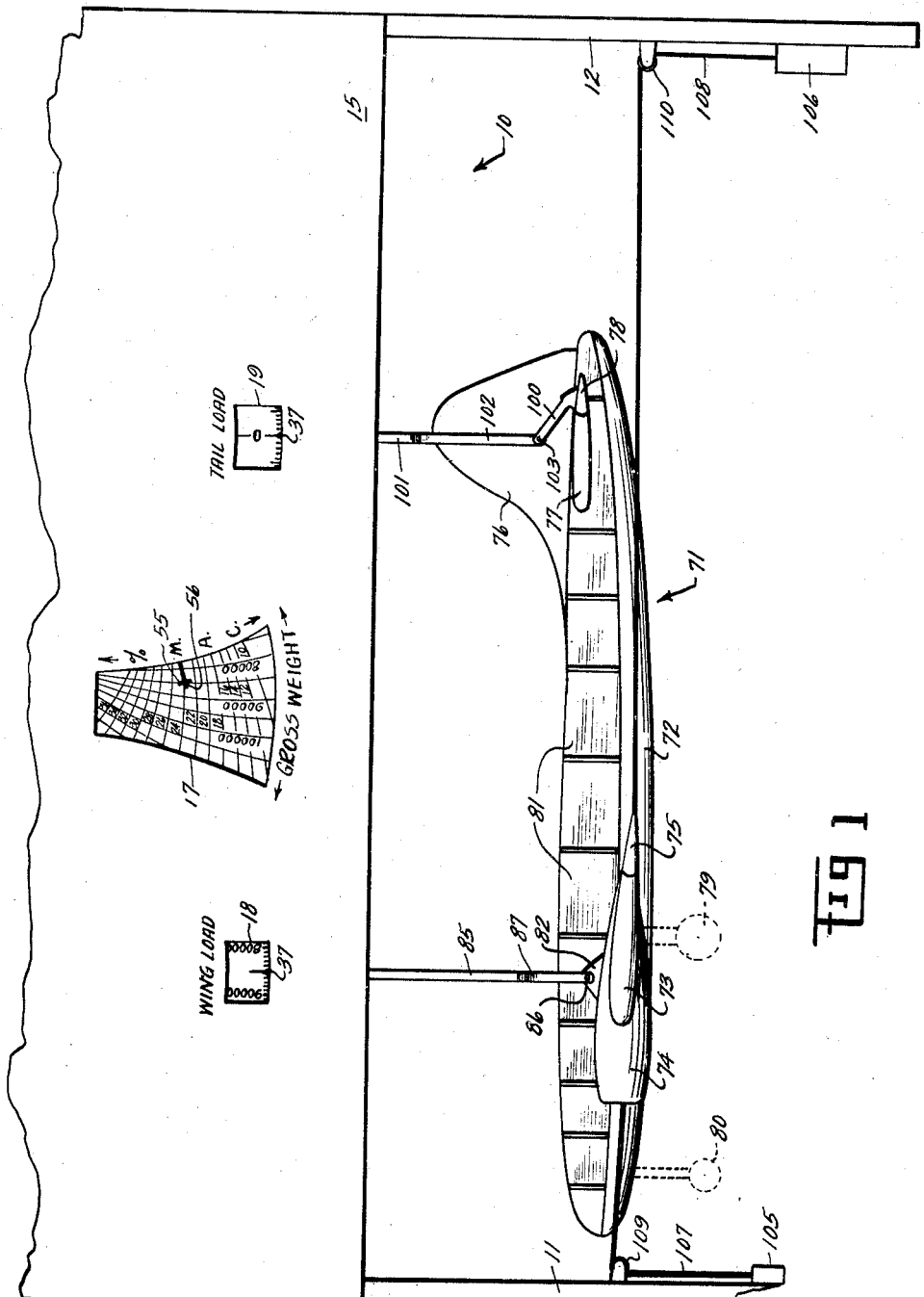
INVENTOR.
CLIFFORD F. DROWN
NORMAN H. ZIMMERMAN
WILLIAM C. ROSS
BY
ATTORNEYS

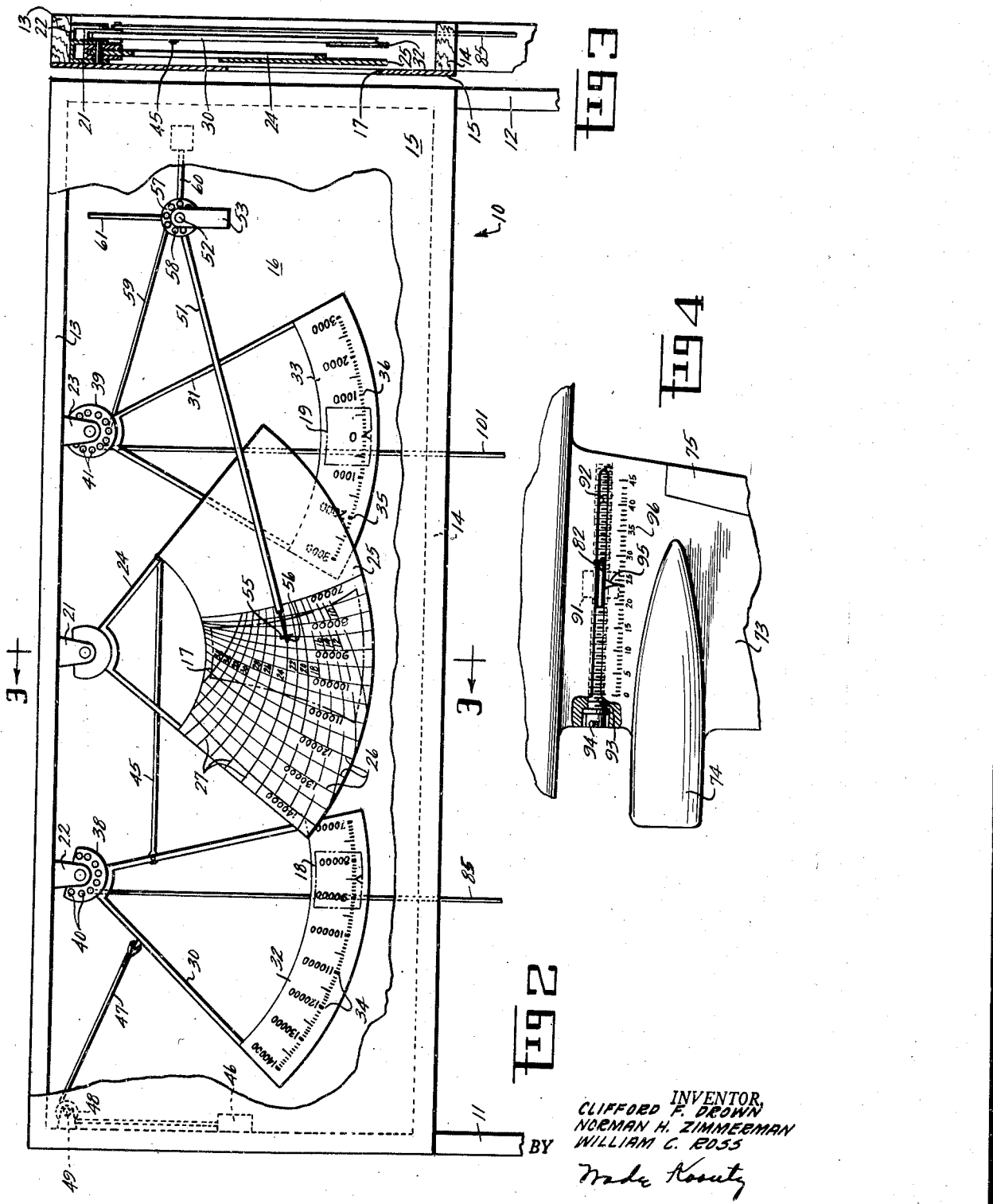

Patented Jan. 31, 1950

2,495,709

UNITED STATES PATENT OFFICE 2,495,709

WEIGHT AND BALANCE TRAINING MODEL

Clifford F. Drown, Oklahoma City, Okla., Norman H. Zimmerman, University City, Mo., and William C. Ross, Dayton, Ohio Application August 20, 1946, Serial No. 691,674

6 Claims. (Cl. 235—61)

(Granted under the act of March 3, 1883, as amended April 30, 1928; 370 O. G. 757)

The invention described herein may be manufactured and used by or for the Government for governmental purposes without payment to us of any royalty thereon.

This invention relates to small scale weight and balance airplane training models to aid in demonstrating visually to aircraft personnel the effects of various load conditions.

It is an important factor in the operation and maintenance of aircraft that the center of gravity (C. G.) is kept within certain limits along the mean aerodynamic chord (M. A. C.) to obtain good stability and controllability, and to avoid exceeding structural limits. Stability and controllability do not necessarily vary in the same fashion. The movement of the C. G. to the front of the aircraft, as by load conditions, or to reduce the C. G. in per cent M. A. C., will increase the stability but this condition can be exaggerated to the extent that less response will be obtained for the same amount of control force. On the other hand, increasing the C. G. in per cent M. A. C. by movement of the C. G. toward the tail of the aircraft, as by load conditions, increases the response to control movement. Under either of these conditions the C. G. can be moved to critical positions along the M. A. C. in which it is undesirable or dangerous for flying operation. The condition of good flight operation of a typical airplane appears to be with the C. G. within the approximate limits of 18% to 34% M. A. C. in order to get proper balance in flight. A C. G. location within the above limits can be obtained by proper location of the movable load.

In order that the C. G. in loading an airplane is maintained within the proper limits to obtain good stability, controllability and balance the aircrew personnel should have some knowledge of the effects of proper and improper loading. The present invention makes it possible to give aircrew personnel a visual practical demonstration of the effects of various loading conditions and provides the instructor with equipment to establish various weight and balance problems, theory and engineering principles. The model demonstrates simulated typical aerodynamic reactions using the relationships between static reactions. It has been found that the actual demonstration with a small scale model airplane supplemented by explanation give the trainees a fuller and better understanding of weight and balance principles in aircraft than lectures, films, posters, etc. It is to be understood, however, that a complete and thorough scientific picture of weight and balance for flight conditions cannot be attained by such a model training aid since the aerodynamic moments of force and their effects on the airplane in flight cannot be taken fully into account, but for all practical purposes the weight and balance training model is valuable for demonstration.

It is a principal object of this invention to provide a weight and balance training airplane model for use in the demonstration of the effects of various loading conditions.

It is another object of this invention to provide a small scale airplane model suspended from indicating means in a framework to register the gross weight, wing load, tail load and C. G. in per cent M. A. C. upon various loading conditions of the model.

It is a further object of this invention to provide a small scale model airplane, divided into station compartments, having an adjustable hangar bracket means attached in the airfoil adjacent the fuselage along the M. A. C. that is connected to a wing load indicator and a rotatable sector card bearing gross weight and per cent M. A. C. scales in a framework, and the elevator of the model connected to a tail load indicator and a pointer movable over the gross weight and per cent M. A. C. scale in the framework for suspending the model to demonstrate the gross weight, wing load, tail load, C. G. in per cent M. A. C. and elevator trim position as a result of various compartment loading conditions.

A still further object of our invention is to provide a framework housing wing load and tail load indicators, the wing load indicator being operatively connected to a rotatable sector card in the framework having gross weight and per cent M. A. C. scales thereon and the tail load indicator operatively connected to a pointer movable over the face of the sector card, a small scale airplane model having station compartments open to the exterior connected at its wing portion to the wing load indicator and its elevator connected to the tail load indicator suspending it in the framework to demonstrate the static effects of weight distributed in the station compartments by registering the wing load and tail load on the respective indicators, the gross weight and the C. G. in per cent M. A. C. by the position of the pointer over the gross weight and per cent M. A. C. scales and the relative change in elevator deflection necessary to trim the airplane for level flight.

Other objects and a fuller understanding of the invention may be had by referring to the following description and claims, taken in conjunction with the accompanying drawings which shall be in no way limitations but merely illustrative to explain the nature and operation of the invention, in which:

Fig. 1 is a front view of the model airplane suspended from indicators in a framework that is partly broken away;

Fig. 2 shows the facepiece of the indicator panel partially broken away to reveal the construction and arrangement of the indicators in the framework;

Fig. 3 is a sectional view taken on the line 3—3 of Fig. 2; and

Fig. 4 is an enlarged partial view of the wing load suspension bracket adjusting means with a part cut away to show the arrangements of parts.

Describing the invention more in detail and referring more particularly to Figs. 1, 2 and 3 in which there is shown a rectangular framework, of any preferred construction and generally referred to by the reference character 10, consisting of two upright members 11 and 12, an upper cross member 13, and a lower cross member 14 substantially intermediate the ends of the upright members 11 and 12. An indicator panel facepiece member 15 is secured on the frame members 11, 12, 13 and 14 to form an indicator enclosure 16 in the framework 10. The facepiece 15 has a central opening 17 closely resembling an isosceles trapezoid and two similar rectangular openings 18 and 19 on opposite sides of the central opening 17.

On the underside of the upper cross member 13, and within the indicator enclosure 16, are fastened three trunnion members 21, 22 and 23 each being centrally located above the openings 17, 18 and 19, respectively. An isosceles triangular frame 24 is pivotally mounted to the trunnion member 21 at the juncture of the equal sides and supports a sector card 25 having a gross weight scale 26 and percentage mean aerodynamic chord (per cent M. A. C.) scale 27 thereon visible through the central opening 17. Pivotally mounted in the trunnions 22 and 23 at the juncture of their equal sides are similar isosceles triangular frames 30 and 31, respectively, supporting sector cards 32 and 33, respectively. The card 32 has a wing load scale 34 thereon, preferably graduated into pounds, adapted to be visible through the opening 18 and generally referred to as the wing load indicator; and the card 33 has positive and negative tail load scales 35, 36 thereon, preferably graduated into pounds, adapted to be visible through the opening 19 and generally referred to as the tail load indicator. The openings 18 and 19 have arrowhead pointers 37 on their lower wall by which the respective indicator may be accurately read. The pivotal portions of the triangular frames 30 and 31 comprise of disc-like portions 38 and 39 with drilled holes 40 and 41, respectively, therein spaced radially about the pivotal axis for the purposes that will later appear apparent. A substantially rigid rod 45 is pivotally connected at its opposite ends to the triangular frames 24 and 30 such that the sector cards bearing the wing load and the gross weight—per cent M. A. C. scales on these two triangular frames will turn simultaneously in the same rotative direction. A weight 46 is connected by a cord 47 operable over a pulley 48 that is rotatably supported on the framework member 12 by the trunnion member 49 to the triangular frame 30 to bias the triangular frames 24 and 30 in a clockwise direction. An indicator pointer 51 is mounted on a pivot 52 of a trunnion member 53 which is supported by the panel facepiece member 15. The indicator pointer 51 is adapted to sweep over the gross weight—per cent M. A. C. scaled sector card and includes cross needle pointers at the indicator end to form a gross weight needle pointer 55 and a per cent M. A. C. needle pointer 56 such that in any position of the indicator pointer 51 over the gross weight—per cent M. A. C. sector card the gross weight indication may be derived by comparing the needle pointer 55 with the gross weight scale 26, and the C. G. in per cent M. A. C. may be determined by the reference of the needle pointer 56 on the per cent M. A. C. scale 27. A disc-like portion 57 at the pivotal portion of the indicator pointer 51 is provided with holes 58 therein. A rod 59 has its opposite ends bent to pass through one of the holes 58 in the disc-like portion of the indicator pointer 51 and one of the holes 41 in the disc-like portion of the tail load triangular frame 31 on opposite sides of the pivotal axes such that a rotation of the triangular frame 31 in a clockwise direction will operate to rotate the indicator pointer 51 in a counterclockwise direction, and vice versa. The indicator pointer 51 has a horizontal extension 60 and a vertical extension 61 arranged about its pivotal axis for receiving weights to balance and dampen the tail load sector card and indicator pointer movement.

Suspended in the framework 10 below the indicator enclosure 16 is a small scale model airplane generally referred to by the character 71 (Fig. 1). The illustrated model is of the well known large four motor type but a model of any other type airplane may be used where desirable by using proper indicators for the particular model. The airplane model 71 shows just the essential elements to properly demonstrate the device and consists of the fuselage 72, airfoils 73, motor nacelles 74, flaps 75, rudder fin 76, stabilizer 77, elevators 78 and landing gear 79 and 80 whose purposes and functions are well known in the aircraft art. A quarter section of the fuselage 72 is cut away longitudinally to expose station compartments 81 for receiving weights representative of the load to be carried in the demonstration exercise. The airfoil 73 has an adjustable hanger bracket 82 in each of its sections adjacent the fuselage within the limits of the M. A. C. that pivotally receives a rigid rod or strap 85 at an opening 86 in the hanger bracket 82. The lower end of the rod or strap 85 is bifurcated at 87 to pass over the fuselage 72 to connect the hanger bracket 82 in each airfoil section. The upper end of the rod or strap 85 is pivotally connected to the wing load indicator by having a portion bent to pass through one of the holes 40 in the disclike portion of the wing indicator triangular frame 30. Any downward load on the rod or strap 85 will actuate the wing load indicator and will rotate the gross weight—per cent M. A. C. sector card 25.

Referring to Fig. 4, each hanger bracket 82 is adjustably mounted (although those brackets may be mechanically connected to be actuated together) in each airfoil section in a direction parallel to the fuselage 72 within the limits of the M. A. C. for positioning the rod or strip 85 at the C. G. of the model along the M. A. C. Each hanger bracket 82 is integral with an internally threaded nut 91 within the airfoil 73 and slidable along a slot 92 in the upper surface of the airfoil. The nut 91 has a screw threaded connection with a screw threaded rod 93 that is held against endwise movement and adapted to be rotated by using a tool as a screwdriver in the slot 94, or the rod 93 may be knurled on the outer end for turning by hand. Integral with the hanger bracket 82 is a pointer 95 that cooperates with a per cent M. A. C. scale 96 on the top surface of the airfoil 73. In this particular illustration the C. G. is arbitrarily chosen for this model to be 24% M. A. C. in which case the model 71 balances on the rod or strap 85 by hanging horizontally with the air foils at the proper angle of attack.

The elevator 78 is spring biased to a neutral position in which it will be in alignment with the stabilizer 77. On the elevator 78 at opposite sides of the rudder fin 76 there is attached a lever arm 100 having its free end extending upward and forward of the pivotal axis of the elevator 78. A substantially rigid rod or strap 101 has a bifurcation 102 at its lower end to extend over the rudder fin 76 and pivotally connect each elevator lever arm 100 at 103. The upper end of the rod or strap 101 is bent to pass through one of the holes 41 in the disc-like portion 39 of the tail load triangular frame 31 forward of its pivot such that a downward pull on the element 101 causes the frame 31 to rotate counterclockwise, and an upward push on the element 101 causes the frame 31 to rotate clockwise. The rods or straps 101 and 85 pass through openings prepared for them in the framework member 14. Any positive or negative tail load of the model 71 will produce a downward or upward force, respectively, on the rod or strap 101 and swing the tail load sector card 33 counterclockwise or clockwise, respectively, to indicate the positive or negative load in pounds or the tail load indicator. At the same time, the indicator pointer 51 will be rotated across the gross weight—percent M. A. C. scales of the sector card 25 in a clockwise or counterclockwise direction, respectively, from which the percentage of C. G. along the M. A. C. can be determined by the needle pointer 56 on the per cent M. A. C. scale 27, and the gross weight can be determined by the position of the cross needle pointer 55 on the gross weight scale 26. Certain areas of the sector card scales 26 and 27 may be colored to indicate critical conditions, if desirable.

The landing wheels 79 and 80 are adapted to be retracted for flying conditions or extended for landing, as shown in dotted lines in Fig. 1, to demonstrate their reaction on the C. G., wing load and tail load of the model.

The flaps 75 are also adapted to be raised and lowered but a true demonstration of their influence on the C. G. cannot be shown by their movement since the aerodynamic reaction is not considered. However, the static effects may be considered for the purpose of the demonstration.

Weights 105 and 106 are connected to the model 71 by cords 107 and 108, respectively, merely to illustrate the thrust and drag on the model in simulated flight. The cord 107 rides over a pulley 109 that is rotatably mounted on the frame member 11 and divides into a crowsfoot of four ends to be attached to the four motor nacelles 74. The cord 108 passes over a pulley 110 that is rotatably mounted on the framework member 12 and is attached to the model 71 at the trailing edge of the airfoil 73. The weights 105 and 106 are only representative of the thrust and drag and are of insufficient moment to produce substantial error in the indicators since a very slight movement of the wing or tail portions of the model is sufficient to actuate the indicators properly. The thrust and drag weights may be disconnected from the model without altering the desirable indicated results.

From the foregoing it may be seen that there is provided a simple and practical model weight and balance training aid for demonstrating the static effects from various loading conditions of aircraft. For the purpose of demonstration it is assumed that the illustrated model airplane weighs 85,000 pounds and the C. G. is at 24% M. A. C. In the absence of any weight in the model 71 it is shown by the indicators that the wing load is 85,000 pounds by the wing load indicator, the tail load indicator is at 0 and the wing load attachment is at 24% M. A. C. on the scale 95, 96. The rod or strip 101 could be disconnected from the tail and the tail would neither rise nor fall showing that the model 71 is balanced with the rod or strap 85 on the C. G. of the model when placed at 24% M. A. C. of the scale 95, 96, a permissible location for the C. G. for typical flying conditions. The 24% M. A. C. is verified by the needle pointer 56 on the per cent M. A. C. scale 27 of the card 25. The gross weight registered by the needle pointer 55 on the gross weight scale 26 showing 85,000 pounds also corresponds with the wing load indicator. Also the elevator is shown arbitrarily in a straight line trim with the stabilizer. Weights may be placed in the station compartments 81 to represent the crew, fuel, passengers, cargo, etc., and the change in wing load, tail load if any, gross weight and the position of the C. G. along the M. A. C., if any, will be represented on the indicators. For example, weights equivalent to 7,500 pounds placed in the different forward station compartments 81 along the fuselage such that the wing load indicator shows 85,000 pounds (upload), the tail load indicator shows a load of —2,500 pounds (download), the gross load shows 92,500 pounds (85,000+7,500 = 95,000 — 2,500 = 92,500) and the C. G. location in percent M. A. C. would register, for example, 15% it would be readily understood that the nose of the model 71 is heavy to a critical point because 15% M. A. C. indicates that the C. G. is now too far forward to allow safe flying conditions. In this condition of loading the elevator 78 will be deflected considerably upward since the upward push of the tail against the rod or strap 101 places a counterclockwise rotative force on the lever arm 100 forcing the elevator 78 to rotate counterclockwise about its pivot to demonstrate relatively the amount of trim required to keep the airplane in level flight if such would be possible. The position of the C. G. at 15% M. A. C. may be proved by rotating the shaft 93 on each section of the airfoil 73 shifting the hanger bracket 82 forward until the pointer 95 rests at 15% at which time the tail load indicator will register 0 checking the percent M. A. C. reading of the needle pointer 56. The shift of these hanger brackets bringing the tail load indicator to register 0 will cause the wing load indicator to shift position but the indicated gross load on the scale 26 by the needle pointer 55 and the indicated C. G. position on the percent M. A. C. scale 27 by needle pointer 56 remains unchanged in value. That is, movement of the pointer 95 toward the 15% indication on the M. A. C. scale 96 causes the wing load indicator frame 30 to rotate clockwise rotating the frame 24 clockwise also since the wing weight is being reduced by 2,500 pounds, but this wing weight reduction increases the weight on the tail by 2,500 pounds causing the tail load frame 31 to rotate counterclockwise and consequently the pointer 51 to rotate slightly clockwise simultaneously with the wing weight changes to maintain an indication of 92,500 pounds gross weight and 15% M. A. C. on the gross weight—M. A. C. scales. The two scales 26 and 27 have been so plotted as to give true indications of the gross weight and the C. G. position in per cent of the M. A. C. regardless of how the load to be carried is distributed as long as the C. G. does not go outside the M. A. C. scale.

On the other hand, the placement of weights in the station compartments 81 such that the wing load indicator registers 90,000 pounds (upload) the gross load indicator registers 92,500 pounds, the tail load indicator registers 2,500 pounds (upload) and the C. G. in percent M. A. C. rose, for example, to 36%, it would be demonstrated that the tail is heavy to a critical point where the plane would not be safe for flying since the actual C. G. is now too far back along the M. A. C. Also the elevator will be deflected downward a considerable amount to show the relative deflection that would be necessary if the airplane could be balanced demonstrating the relative change in elevator position for a typical level flight condition. The actual C. G. can be checked on the scales 95, 96 in the same manner as set out above. It is not intended that the deflection of the model elevator be quantitatively representative of the actual trim in full scale since other flight variables are involved. It is to be understood that in the foregoing examples the indication on the wing and tail load indicators are the reactions that would be obtained if the airplane were supported at these points and at rest.

The effects of raising and lowering the land wheels 79, 80 may also be studied along with the static effects of various loading conditions since their change in position alters the C. G. position.

Although a certain specific embodiment of the invention has been shown and described herein, it will be apparent to those skilled in the art that many modifications of the application thereof, as well as the details of construction, is possible without departing from the spirit and scope of this invention.

We claim:

1. A weight and balance aircraft training aid comprising; a framework housing a wing load indicator, a tail load indicator, a rotatable sector card having gross weight and percent M. A. C. scales thereon and an indicator pointer operative over the scales of said sector card, the said wing load indicator and the said sector card being operatively joined, and the said tail load indicator and the said indicator pointer being operatively joined; and means suspending a small scale model airplane in the said framework, said means comprising an attaching means between the wing portion of the said model airplane and the said wing load indicator, and another attaching means between the tail portion of the said model airplane and the said tail load indicator whereby weight distributed along the fuselage will demonstrate the effects on the model airplane by indications of the wing load, tail load, gross weight and C. G. in percent M. A. C.

2. A weight and balance aircraft training aid comprising; a framework housing a wing load indicator, a tail load indicator, a rotatable sector card having gross weight and percent M. A. C. scales thereon operatively connected to and movable with the wing load indicator, and an indicator pointer movable across the scales of the said sector card operatively connected to and actuatable with the tail load indicator, said sector card and indicator pointer constituting a single reading dual indicator for indicating the gross weight and C. G. in percent M. A. C.; a small scale model airplane having a neutrally biased elevator with a lever arm constructed and arranged to deflect the said elevator in an opposite direction to a force acting on the said lever arm; a link connection between the wing portion of the said model airplane and the said wing load indicator; and a link connecting the said elevator lever arm and the said tail load indicator whereby weight distributed along the fuselage of the model airplane will demonstrate the static effects on the model airplane by indications of the wing load, tail load, gross weight, C. G. in percent M. A. C. and the relative elevator trim for flight.

3. The combination as set forth in claim 2, wherein the attaching means at the wing portion of the said model airplane comprises a hanger bracket adjustable along the M. A. C. of the said model airplane on which there is a pointer in indicating relation over a percent M. A. C. scale on the wing portion for adjusting the point of suspension at the C. G. along the M. A. C., and a rod pivotally linking the said hanger bracket and the said wing load indicator.

4. The combination as set forth in claim 2, wherein the attaching means at the wing portion of the said model airplane comprises a hanger bracket adjustable along the M. A. C. on which is a pointer cooperatively associated with a percent M. A. C. scale on the wing portion for adjusting the point of suspension at the C. G. along the M. A. C., and a rod pivotally linking the said hanger bracket and the said wing load indicator; and the attaching means at the tail portion comprises a lever arm attached to a neutrally biased elevator of the said model airplane with the free end thereof extending forwardly and upwardly of the elevator pivot, and a substantially rigid rod linking the free end of said elevator lever arm and the said tail load indicator for indicating the relative elevator deflection to trim the airplane in flight.

5. A weight and balance training aid comprising; a framework; wing load and tail load indicators housed in the said framework, the said wing load indicator being operatively connected to rotate a pivotally mounted sector card in the said framework having gross weight and percent M. A. C. scales superimposed thereon upon operation of said wing load indicator, and the said tail load indicator operatively connected to actuate simultaneously an indicator pointer across the scales of the said sector card for indicating the gross weight and C. G. in percent M. A. C.; a small scale model airplane divided into station compartments along the fuselage having a neutrally biased elevator in which it is in line with the stabilizer, a lever arm fixed to the elevator with the free end extending forward and upward of the elevator pivot, and a hanger bracket adjustably attached to each airfoil of the said model airplane along the M. A. C., each bracket having a pointer movable over a percent M. A. C. scale on the corresponding airfoil to indicate the suspension point of said model along its M. A. C.; and a bifurcated rod connecting the said hanger brackets with the said wing load indicator and a rod connecting the free end of the said lever arm with the said tail load indicator suspending the said model airplane in the said framework whereby the disposition of weight in the station compartments will demonstrate the static effects on the model airplane by registration of the wing load, tail load, gross weight and C. G. in percent M. A. C. on the indicators, and the relative elevator trim for flight conditions.

6. A weight and balance aircraft training aid comprising; a framework supporting a wing load indicator means, a tail load indicator means, a rotatable sector card having superimposed gross weight and percent M. A. C. scales thereon, and an indicator pointer movable across the said gross weight—percent M. A. C. scales, the said wing load indicator means being operatively connected to the said rotatable sector card and the said tail load indicator means being operatively connected to the said indicator pointer for registering wing load, tail load, gross weight and C. G. in percent M. A. C.; a small scale model airplane having retractible landing gear under the fuselage and wings and having station compartments along the fuselage open to the exterior for receiving weights, a neutrally biased elevator with a lever arm attached thereto on opposite sides of a rudder fin and extending upward and forward of the elevator pivot to permit elevator deflection denoting relative elevator trim in flight for various tail loads, a hanger bracket in the airfoil adjacent and on opposite sides of the fuselage adjustable along the M. A. C. to permit adjustment of the C. G. position for various load conditions in the said station compartments and the retractible landing gear; and two substantially rigid connecting means having a bifurcation on one end pivotally joining each the said hanger brackets with the said wing load indicator means and the said lever arms with the said tail load indicator means suspending the said model airplane to transmit weight and balance conditions to the indicators, said gross weight scale being so calibrated and the said indicator pointer being so connected to said tail load indicator that the gross weight—percent M. A. C. indication will always show the gross weight as being the sum or difference of the indications on the wing load and tail load indicators and the position of the C. G. along the M. A. C. will always be indicated in accordance with the weight distribution of the small model airplane including its carried load.

CLIFFORD F. DROWN.
NORMAN H. ZIMMERMAN.
WILLIAM C. ROSS.

REFERENCES CITED

The following references are of record in the file of this patent:

UNITED STATES PATENTS

| Number | Name | Date |
| --- | --- | --- |
| 1,906,443 | Bisch | May 2, 1933 |
| 2,331,304 | Carmody | Oct. 12, 1943 |
| 2,391,243 | Hutton | Dec. 18, 1945 |
| 2,391,257 | McWhorter | Dec. 18, 1945 |

FOREIGN PATENTS

| Number | Country | Date |
| --- | --- | --- |
| 356,158 | Germany | July 17, 1922 |